United States Patent [19]

Iiskolan et al.

[11] Patent Number: 4,829,034

[45] Date of Patent: May 9, 1989

[54] PROCEDURE FOR MANUFACTURING CATALYST COMPONENTS FOR POLYMERIZING OLEFINES

[75] Inventors: Eero Iiskolan, Porvoo; Jukka Koskinen, Espoo, both of Finland

[73] Assignee: Neste Oy, Finland

[21] Appl. No.: 158,273

[22] PCT Filed: Jun. 9, 1987

[86] PCT No.: PCT/FI87/00078

§ 371 Date: Feb. 5, 1988

§ 102(e) Date: Feb. 5, 1988

[87] PCT Pub. No.: WO87/07620

PCT Pub. Date: Dec. 17, 1987

[30] Foreign Application Priority Data

Jun. 9, 1986 [FI] Finland .................................. 862459

[51] Int. Cl.$^4$ ............................................... C08F 4/64
[52] U.S. Cl. ....................................... 302/9; 502/107; 502/111; 502/121; 502/123; 502/125; 502/127
[58] Field of Search ................... 502/9, 107, 111, 125, 502/127, 121, 123

[56] References Cited

U.S. PATENT DOCUMENTS

| | | | |
|---|---|---|---|
| 3,953,414 | 4/1976 | Galli et al. | 502/123 X |
| 4,111,835 | 9/1978 | Foschini et al. | 502/9 |
| 4,315,874 | 2/1982 | Ushida et al. | 502/134 X |
| 4,392,983 | 7/1983 | Hartshorn et al. | 502/9 X |
| 4,421,674 | 12/1983 | Invernizzi et al. | 502/111 X |
| 4,506,027 | 3/1985 | Invernizzi et al. | 502/111 |

FOREIGN PATENT DOCUMENTS 0044735 1/1982 European Pat. Off. ................ 502/9

*Primary Examiner*—Patrick P. Garvin
*Attorney, Agent, or Firm*—Steinberg & Raskin

[57] ABSTRACT

The invention concerns a procedure for manufacturing solid catalyst components for catalysts serving polymerization of alpha-olefines, having a solid carrier substance containing an organic or inorganic magnesium compound and treated with a titanium halide and optionally with an electron donor compound. The magnesium compound or the mixture of magnesium compound and electron donor compounds is sprayed in molten state into a chamber or volume which has been cooled to a temperature at which the catalyst component will solidify from the melt in the form of particles with generally spherical shape, without any substantial evaporation of solvents.

18 Claims, 1 Drawing Sheet

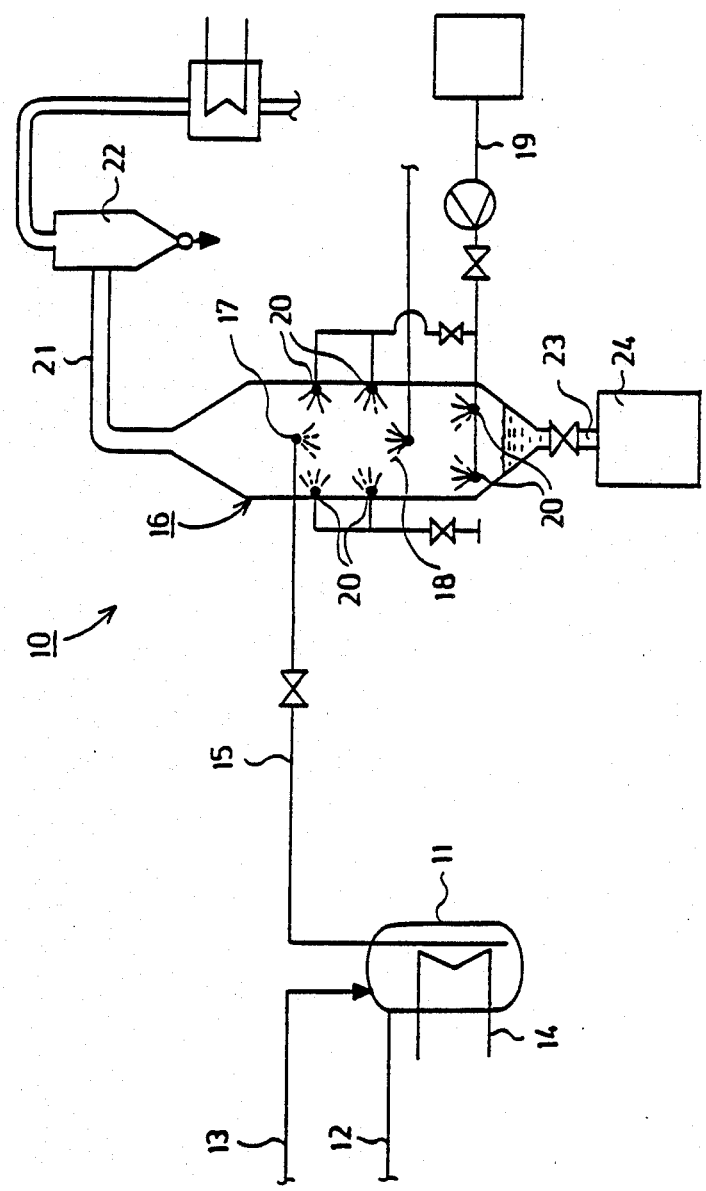

PROCEDURE FOR MANUFACTURING CATALYST COMPONENTS FOR POLYMERIZING OLEFINES

BACKGROUND OF THE INVENTION

The present invention relates to a procedure for manufacturing catalyst components to be used in polymerizing olefines. In particular the invention relates to the manufacturing of catalyst and carrier components having spherical shape, for olefin-polymerizing catalysts.

The use of Zieglar-Natta catalysts towards polymerizing olefines is known in the art. Such catalysts typically comprise a magnesium-based carrier substance which has been treated with a titanium halogen compound, and often also with an electron donor compound. Numerous methods have been worked out for manufacturing catalysts of this type, and a very great number of different compounds have been applied in order to modify said typical catalysts.

It is desirable in view of polymerizing that the catalysts have highest possible activity and thereby the required catalyst quantity is as small as possible. It is furthermore possible by the selection of catalyst to influence many other polymerization characteristics. Endeavours are frequently directed towards a result in which the products that are obtained would be in the form of even-sized, preferably spherical particles. This is reached, for instance, by the aid of using a catalyst carrier substance which occurs in the form of spherical particles of uniform quality.

Various methods are known in the art for producing carrier particles with spherical shape. In the so-called emulsion oil method, a melt of the carrier component is emulsified in a suitable oil, to be present therein in the form of spherical melt particles. The carrier particles in the emulsion are then shock-solidified by adding the emulsion into a cold hydrocarbon fluid, where the particles solidify. One of the drawbacks of this procedure is that preparing the carrier substance requires a component which is not useful in the later steps of catalyst manufacturing and which implies the existence of purifying and recirculation apparatus to this purpose. Another significant drawback is that this a charge process, in which the retention time is often prolonged, even up to several hours.

Another technique of the prior art for preparing particles of spherical shape for catalysts is the so-called spray drying method. For instance, in the GB Pat. No. 1,434,543 is disclosed a procedure wherein magnesium chloride is sprayed in molten state, or in aqueous solution, into hot air or nitrogen with the aid of a nozzle having such size that the particles which are formed will have the requisite particle size. In the U.S. Pat. No. 4,506,027, an equivalent procedure has been disclosed wherein ethanol and methanol solution of magnesium chloride is sprayed in droplet from into a hot nitrogen flow. The spray drying technique disclosed in these patents which have been described is based on the expedient that from the droplets produced in the nozzle, fluid is evaporated off with the aid of a hot, inert gas and as ultimate result solid carrier particles which are generally round in shape are obtained.

The spray drying method has some drawbacks which are partly associated wiht the quality of the carrier components obtained by the method and partly also with the process factors themselves. In spray drying, when a solvent is used, a change of the chemicals composition takes place all the time as solvent, to begin with, evaporates from the solution and, thereafter, from the surfaces of the solid carrier particles. As a consequence, the composition of the particles that are produced is not fully under control. The continuous evaporation of solvent from the particles causes growth of the particles' surface area and finally leads to particles which are porous and non-uniform in quality, containing varying amounts of solvent. Porosity detracts from the mechanical durability of the catalyst components and also impairs the activity of the catalyst that is obtained and its morphological properties. Another drawback is associated with the safety considerations of the process. Since the method is based on evaporating solvents, a consequence is that one has to handle great solvent quantities in gaseous form, and this involves a safety risk. Furthermore, comparatively high temperatures have to be used in the process, and this is not appropriate for all chemicals which are required.

SUMMARY OF THE INVENTION

With the aid of the invention a procedure is achieved by the aid of which catalyst components can be manufactured in spherical shape without incurring the drawbacks connected with the above processes. In particular, with the aid of the invention a procedure is achieved in which carrier components with spherical shape can be produced which also contain other active, or inert, additives or components required in the catalyst component. Furthermore, it is possible by the procedure of the invention to manufacture in one single step even fully completed catalyst components which are then directly usable as olefine-polymerizing catalysts.

These, and other advantages which will become apparent later on, are achieved with the procedure of the invention for manufacturing solid catalyst compounds for such polymerizing catalysts for alpha-olefines containing more than two carbon atoms, or copolymerizing catalysts for one or several alpha-olefines as mentioned and ethylene which comprise a solid carrier substance containing an organic or inorganic magnesium compound, treated with a titanium halide and with an electron donor compound.

The procedure of the invention is characterized in that said magnesium compound, or a mixture of said magnesium compound and said electron donor compound, is sprayed in molten state into a chamber, or volume, which has been cooled to a temperature at which the catalyst component solidifies from said melt in the form of particles with generally spherical shape, without any substantial evaporation of components, whereafter said titanium halide treatment is carried out.

By the procedure of the invention several advantages are gained, compared with the spray drying technique. In the procedure of the invention the composition of the carrier solution is constant all the time and no solvent evaporation takes place, as is the case in the spray drying process. The particles that are produced are therefore uniform in quality and their structure is not porous as is that of particles produced by the spray drying method. The composition of the particles can be adjusted to be as desired, and it is thus understood that the composition does not change during the manufacturing process. As a consequence, the particles are also more durable mechanically. Secondly, according to the invention the formation of particles takes place at comparatively low temperatures, at which the chemicals and solvents that are used neither evaporate nor decompose. The process is also safe because it is not necessary to evaporate large quantities of solvent.

A significant additional advantage of the procedure of the invention is that with its aid it is possible, in one apparatus and in one step, to produce either exclusively spherical carrier particles or carrier particles which contain other active, or inert, substances needed in the catalyst, or even fully completed active catalyst components which are directly applicable in polymerizing olefines. This is not possible in the spray drying method of prior art.

The procedure of the invention is suitable for manufacturing carrier components of both inorganic and organic magnesium compounds, advantageously of halogenated magnesium compounds.

Examples of inorganic magnesium compounds are, for instance, magnesium chloride and magnesium compounds obtained from inorganic magnesium compounds by the aid of chlorinating agents, such as chlorine and hydrochloric acid. A recommendable inorganic magnesium compound is magnesium chloride. Examples of organic magnesium compounds are those compounds which are obtained when organic magnesium compounds, such as magnesium alkyl compounds, react with chlorinating compounds. Examples of said magnesium alkyl compounds are: diethylmagnesium, ethylbutylmagnesium, ethylhexylmagnesium, ethyloctylmagnesium, dibutylmagnesium, butylhexylmagnesium, butyloctylmagnesium, dicyclohexylmagnesium. A recommendable magnesium alkyl compound is butyloctylmagnesium.

By the procedure of the invention carrier and catalyst components can be manufactured which contain, in addition to the above-mentioned magnesium compounds, electron donor compounds such as are normally used in this kind of catalysts as well as other auxiliary substances which may be required. For auxiliary substances, alcohols are advantageously used, for instance methanol or ethanol. It is only a prereqisite for using a donor that the donor when mixed with a solid magnesium compound on heating forms a melt which can be sprayed with the aid of a nozzle. The electron donor may thus be selected from the group comprising aliphatic or aromatic carboxylic acids, aliphatic or aromatic alkylesters of carboxylic acids, ethers, aliphatic or aromatic ketones, aliphatic and aromatic aldehydes, aliphatic and aromatic alcohols, aliphatic and aromatic halides, e.g. acid halides, aliphatic and aromatic nitriles, aliphatic and aromatic amines aliphatic, and aromatic phosphines and phosphines and aromatic and aliphatic silicon ethers. An advantageous combination of magnesium compound and electron donor and/or auxiliary substance can be described by the following formula: $MgCl_2 \cdot LOH_x \cdot ySKY$, wherein $x = 1$ to 6, $y = 0$ to 1.0 and LOH and SKY have been selected from the above-mentioned class of electron donors. A highly recommendable and frequently used electron donor is diisobutylphthalate, and a recommendable alcohol is ethanol. LOH may be a lower alkyl alcohol containing between 1 to 10 carbon atoms.

The mixture to be sprayed is prepared simply by melting the selected catalyst component or component mixture. The melt is conducted into the spaying chamber with the aid of a pump or advantageously of a pressurized, inert fluid, for instance nitrogen.

In the procedure of the invention the melt, or solution, of the carrier compound is sprayed into a cooled chamber at a temperature which at least equals the melting point of said carrier compound which is used, advantageously one approximately equal to the melting point. Spherical particles are manufactured by conducting the melt with the aid of pressure to a nozzle located in the varying chamber, with nozzle dispersing it into fine droplets. It is possible with the choice of nozzle size to influence the size and size distribution of the carrier particles which are produced in the process. At the same time, cold inert gas, for instance nitrogen or air, is conducted through the bottom of the chamber upward from below, which rapidly cools the particles coming from the nozzle. The cooling may be enhanced by spraying at the same time into the chamber a cold, inert hydrocarbon or another liquid fluid. It is not necessary to spray the cooling gas or cooling fluid into the chamber in countercurrent to the sprayed melt. It is also possible to spray cooling fluid with the current of the melt spray if in this way fast enough solidifying to solid particles is achievable. What is essential in the cooling event is that the cooling is so fast that the melt solidifies to solid state before it hits the walls of the apparatus and that no significant evaporation of the components contained in the carrier substance has time to take place. The catalyst particles fall down on the bottom of the spraying chamber or to the layer of liquid accumulating there, wherefrom they can be removed through the lower part of the spraying chamber. The inert gases escaping from the upper part may be carried through a cyclone in order to separate any small carrier particles which may have been entrained.

As has been said in the foregoing, it is possible in the procedure of the invention to manufacture, as may be required, either mere carrier substance particles or carrier particles containing, in addition, other inert or active auxiliary substances. It is thus for instance possible to manufacture adducts formed by magnesium chloride and an alcohol, which are easy to activate to become a completed catalyst. From magnesium chloride and ethanol, for instance, a carrier component can be manufactured in the procedure of the invention in that a mixture of magnesium and ethanol is heated in an autoclave, in a nitrogen atmosphere, at least to its melting point or preferably slightly higher. Th melting point is essentially dependent on the ethanol quantity added. Compressed nitrogen is used to supply the molten mixture into the cooling chamber with the aid of a nozzle, which disperses the melt into small droplets. At the same time cold inert cooling gas, such as nitrogen or air (e.g. $-20°$ C.), is supplied into the chamber and, if required, also an inert cooling liquid, e.g. heptane. Solid carrier particles will then be formed which have a diameter on the order of 0-100 $\mu$m. The carrier particles accumulating on the bottom of the chamber are removed for further treatment, which may for instance be treatment with an electron donor, or an activation treatment. The carrier particles are at this time already at a suitable temperature for the next treatment.

The procedure of the invention further enables such carrier components to be manufactured in the same apparatus which contain the abovementioned electron donor compounds. In that case, the exemplary case described above may be modified so that the substance mixture which is sprayed into the chamber contains, in addition to the magnesium component and the ethanol component, an electron donor component. The carrier particles which solidify in the chamber may then be carried directly to the next manufacturing step, that is, to activation, for instance to titanizing, in which the treatment is carried out with titanium tetrachloride. In the same way other active components may be added to the carrier component.

The procedure of the invention may further be applied in manufacturing completed catalysts treated with titanium tetrachloride. The ways above described may then be applied so that for cooling fluid is used, instead of an inert fluid, cold titanium tetrachloride, which may be sprayed against the melt spray coming from the nozzle. In that case simultaneous solidification of the catalyst component to solid particles and activation of the catalyst component to a completed, active catalyst component will take place, the latter being directly usable for polymerizing, or subjectable to various additive treatments if required.

In the procedure that has been described, the cooling during the first activation step renders possible high activity of the catalyst because the efficient cooling prevents unfavourable temperature increase during the titanizing in the first step.

BRIEF DESCRIPTION OF THE DRAWING

The invention is further illustrated by referring to the appended FIGURE, which presents an apparatus appropriate for applying the procedure of the invention.

DESCRIPTION OF THE PREFERRED EMBODIMENTS

The apparatus 10 of the invention comprises a mixing tank 11 for mixing and melting the catalyst components and into which the catalyst components which are used, such as carrier component, alcohol or electron donors, can be introduced through the connector 12. Into the mixing tank 11 may also be conducted inert, pressurized nitrogen gas through the pipe 13, and the mixing tank 11 has in addition been provided with heating means 14 for melting the catalyst component mixture. The mixture melted in the mixing tank 11 is conducted with the aid of nitrogen pressure by the heat-escorted pipe 15 to the spraying chamber 16, to the nozzle 17, where it is dispersed into small droplets. Into the spraying chamber 16 is also conducted cold inert cooling gas by the nozzles 18 and cold liquid cooling fluid with the aid of the pipe 19 and nozzles 20. From the upper part of the chamber 16, the gases escape through the pipe 21 to a separator 22, where any solid catalyst components that may have been entrained can be removed. The solidified catalyst particles are removed from the lower part of the chamber 16 by the pipe 23 to a product container 24, in which for instance the next treatment step may be carried out, which may for instance be treatment with an electron donor compound or activation, or additional activation.

EXAMPLE 1

A nitrogenated autoclave of capacity 110 liters was charged with 35 kg of dry $MgCl_2$, 65 liters of dry EtOH and 10 liters of diisobutylphthalate. This reaction mix was melted at +110° C., with mixing at the ultimate stage. After mixing for 2 hrs. the clear, homogenized mixture was supplied at a rate of 10 kg/h into a cooled spray chamber, into which nitrogen at −20° C. was conducted for cooling fluid. The nozzle type was a 9-mm gas/liquid fluidizing nozzle with melt feeding aperture 1.0 mm in diameter and spraying angle 60°. Dried nitrogen at +130° C. served as spraying gas, its feed rate being 1 kg/h. The product was free-flowing and spherical in shape, and it emerged at temperature about 0° C.

The analytic result was Mg 9.2% by wt. and Cl 26.3% by wt., according to which the chemical composition of the product was the same as that of the starting material melt: $MgCl_2 \cdot 3 \, EtOH \cdot 0.1 \, DIBP$.

The particle size distribution was in the range 10–300 microns. The fraction <74 microns was separated from the product by screening, for activation of the catalyst carrier. Preparation of carrier and catalyst was performed in a nitrogen atmosphere with $H_2O < 5$ ppm and $O_2 < 5$ ppm. Activation took place as follows, using $TiCl_4$/EtOH mole ratio: 8.7: 27.2 g of the above, screened product were added at 0° C. into 300 ml of $TiCl_4$. The carrier was allowed to react at this temperature for 1 hr, with mixing. The temperature was then slowly raised to +120° C., and it was kept at this height for 2 hrs. The treatment was repeated with 300 ml of $TiCl_4$ at +120° C. for 2 hrs. The product was further washed with 300 ml of heptane at +70° C. The washing was repeated five times, and the product thus obtained was dried in vacuum at room temperature. The dry catalyst had violet colour.

The analytic results of the catalyst were: Ti 2.4% by wt.: Mg 16.9% by wt., and Cl 50.5% by wt.

Polymerizing was carried out in a 2-liter autoclave, using 1.2 liters of heptane for fluid, as follows:

| | |
|---|---|
| $P(C_3H_6) = 9.7$ bar | Al/Ti = 200 |
| $P(H_2) = 0.3$ bar | Al/Donor = 20 |
| T = +70° C. | Catalyst quantity = 32.0 mg |
| t = 3 h | |

For cocatalyst triethylaluminium was used and for electron donor, diphenyldimethoxysilane.

The activity of the catalyst was 334 kg polypropylene per g Ti.

The evaporation residue from the polymerizing fluid was 0.8% by wt., referred to the total polypropylene quantity obtained. The polypropylene had isotacticity 99.2%, isotacticity index 98.6% and specific density 0.46 g/cm³. The melt index of the polymer was 4.4 g/10 min. The polymer that was obtained was round in shape and free-flowing. The polymer had the following particle distribution:

| Particle size, mm | % by weight of the product |
|---|---|
| >2.0 | 0.1 |
| 2.0–1.0 | 79.1 |
| 1.0–0.5 | 16.7 |
| 0.5–0.18 | 2.4 |
| 0.18–0.10 | 0.8 |
| 0.10–0.056 | 0.6 |
| <0.056 | 0.3 |

Preparation of catalyst carrier, activation and polymerization were repeated, in the way described above. The analytic results of the catalyst were: Ti 2.0% by wt., Mg 16.7% by wt., and Cl 51.3% of wt. The results of polymerizing were as follows. The activity of the catalyst was 345 kg polypropylene per g Ti. The evaporation residue from the polymerizing fluid was 2.2% by wt. of the total quantity of polymer obtained. The polymer had isotacticity 99.2%, isotacticity index 97.0% and specific gravity 0.47 g/cm³. The melt index of the polymer was 7.1 g/10 min. The polymer that was obtained was round in shape and free-flowing. The particle size distribution of the polymer was:

| particle size, mm | % by weight of the product |
| --- | --- |
| >2.0 | 0.2 |
| 2.0–1.0 | 70.5 |
| 1.0–0.5 | 20.9 |
| 0.5–0.18 | 6.1 |
| 0.18–0.10 | 1.3 |
| 0.10–0.056 | 0.7 |
| <0.056 | 0.3 |

The quality characteristics of the catalyst activated by the catalyst carrier manufacturing procedure of the invention are eminently reproducible, which is a decisive factor in process catalyst manufacturing.

EXAMPLE 2

An $MgCl_2$/ethanol/DIBP mixture was melted at +120° C. and spraycrystallized as in Example 1, with the exception that the DIBP/Mg ratio was 0.05.

| Particle size, microns | % by weight of total weight |
| --- | --- |
| >105 | 30.2 |
| 105–74 | 33.7 |
| <74 | 36.1 |

The particle size distribution of the solid product was: The analytic result was: Mg 9.6% by wt., Cl 27.8% by wt., corresponding to the composition of the input melt, $MgCl_2 \cdot 3$ EtOH $\cdot 0.05$ DIBP.

The catalyst was prepared as in Example 1.

The analytic results of the catalyst were: Ti 3.5% by wt., Mg 13.0% by wt., and Cl 50.6% by wt.

Propylene was polymerized with the catalyst as in Example 1.

The performance of the catalyst and characteristics of the polymer were:

| | |
| --- | --- |
| Activity | 279 kg PP per g Ti |
| Isotacticity | 94.5% |
| Evaporation residue | 7.7% |
| Isotacticity index | 87.2% |
| Melt index | 12.1 g/10 min. |
| Specific density | 0.45 g/cm$^3$ |

The morphology of the polypropylene was spherical, but it was slightly sticky owing to low isotacticity index.

The particle size distribution of the polymer was:

| Particle size, mm | % by weight of the product |
| --- | --- |
| >2.0 | 0.1 |
| 2.0–1.0 | 65.3 |
| 1.0–0.5 | 29.0 |
| 0.5–0.18 | 4.7 |
| 0.18–0.10 | 0.5 |
| 0.10–0.056 | 0.4 |
| <0.056 | — |

EXAMPLE 3

A nitrogenated autoclave of capacity 110 liters was charged with 35 kg of dry $MgCl_2$ and 80 liters of dry EtOH. This reaction mix was melted at 140° C., with mixing at the ultimate stage. After mixing for 8 hrs, the clear, homogenized mixture was supplied at a rate of 10 kg/h into a cooled spray chamber, which was cooled with nitrogen at −20° C. The nozzle type was a 9-mm gas/liquid fluidizing nozzle with melt feeding aperture 1.0 mm in diameter and spraying angle 60°. Nitrogen at 140° C. served as spraying gas, its feed rate being 1 kg/h.

The product was free-flowing and spherical in shape. The product had the same chemical composition as the starting material melt ($MgCl_2 \cdot 3.7$ EtOH). The particle distribution was in the range 10–300 microns. The fraction <74 microns was separated from the product by screening, for activation.

Activation took place as follows. 6.9 g of the above, screened product were added at 0° C. into 200 ml of $TiCl_4$. ($TiCl_4$/EtOH mole proportion=20). The carrier was allowed to react at this temperature for 1 hr, with mixing, whereafter 1.2 ml of diisobutylphtalate (DIBP/Mg mole proportion=0.2) were added and the temperature was slowly raised to +110° C., for 1 hr. The treatment was repeated with 200 ml of $TiCl_4$ at +110° C. for 1 hr. The product was further washed with 300 ml of heptane at +70° C. The washing was repeated five times, and the product thus obtained was dried in vacuum at room temperature. The analytic results of the catalyst were:

Ti 1.5% by wt.; Mg 15.6% by wt., and Cl 47.0% by wt.

Polymerizing was performed as in Example 1. The activity of the catalyst was 380 kg polypropylene per g Ti. The evaporation residue from the polymerizing fluid was 0.5% by wt: of the total quantity of polymer obtained. The isotacticity of the polypropylene was 98.0%, isotacticity index 97.5% and specific gravity 0.40 g/cm$^3$. The particle size distribution of the polymer was:

| Particle size, mm | % by weight of the product |
| --- | --- |
| >2.0 | 0.10 |
| 2.0–1.0 | 43.4 |
| 1.0–0.5 | 37.9 |
| 0.5–0.18 | 15.1 |
| 0.18–0.10 | 2.2 |
| 0.10–0.056 | 1.0 |
| <0.056 | 0.3 |

EXAMPLE 4

An $MgCl_2$ melt was spray-crystallized as in Example 3, except that the EtOH/$MgCl_2$ proportion was 2.9.

The solid product had the following particle size distribution:

| Particle size, microns | % of total weight |
| --- | --- |
| >105 | 42.2 |
| 105–74 | 27.6 |
| <74 | 30.2 |

The analytic result was: Mg 11.1% by wt., Cl 30.2% by wt. On the basis of the analytic data, the gross formula of the complex corresponds to $MgCl_2 \cdot 2.9$ EtOH.

Morphologically, the product was free-flowing, spherical powder. 0.105 moles of $MgCl_2 \cdot 2.9$ EtOH with size <74 microns were activated as in Example 3, with the exception that the $TiCl_2$/EtOH mole proportion was 8.7 in the first and second titanizing. The DIBP/Mg molar proportion employed was 0.2. The analytic results of the catalyst were: Ti 4.6% by wt., Mg 13.1% by wt., and Cl 52.3% by wt.

The catalyst was used to polymerize propylene as in Example 1.

The performance of the catalyst and the characteristics of the polymer were as follows:

| Activity | 215 kg PP per g Ti |
| Isotacticity | 99.7% |
| Evaporation residue | 1.5% |
| Isotacticity index | 98.2% |
| Melt index | 11.8 g/10 min. |
| Specific density | 0.42 g/cm$^3$ |

The polypropylene had spherical morphology.
The particle size distribution of the polymer was:

| Particle size, mm | % by weight of the product |
|---|---|
| >2.0 | 0.1 |
| 2.0–1.0 | 60.9 |
| 1.0–0.5 | 35.4 |
| 0.5–0.18 | 4.0 |
| 0.18–0.10 | 0.4 |
| 0.10–0.056 | 0.2 |
| <0.056 | — |

COMPARISON EXAMPLE 1

A catalyst was prepared otherwise as in Example 4, but MgCl$_2$ . 3 EtOH was used for starting material and preparation took place without diisobutylphthalate. The catalyst had yellowish-brown colour. The analytic data of the catalyst were: Ti 9.2% by wt., Mg 12.8% by wt., and Cl 59.0% by wt.

Polymerizing was performed as in Example 1. The activity of the catalyst was 75 kg PP per g Ti. The evaporation residue from the polymerizing fluid was 17.4% by wt. of the total polymer quantity obtained. The polypropylene had isotacticity 79.4% and isotacticity index 65.6%. Its specific density could not be determined because the solid polymer was agglomerated and it was not free-flowing.

The result of polymerization clearly reveals that if no electron donor compound is used in conjunction with catalyst preparation, the activity of the catalyst and the isotactic properties and morphological characteristics of the polypropylene are so poor that the catalyst fails to meet the quality requirements commonly imposed on stereo-specific alpha-olefine polymerizing catalysts. A catalyst of this type also is not appropriate for use in polymerizing processes (e.g. polypropylene, polybutylene, poly-4-methyl-pentylene, etc.).

COMPARISON EXAMPLE 2

The component to be sprayed was prepared as in Example 3, except that the EtOH/MgCl$_2$ molar proportion was 8, and TiCl$_4$ was added to the mixture applying MgCl$_2$/TiCl$_2$ molar proportion 1. The product thus obtained was melted at +90° C. and spray-crystallized.

The product which was obtained had the composition: MgCl$_2$ TiCl$_2$ (OEt)$_2$ . 6.0 EtOH.

40 g of the above product were admixed to 300 ml of heptane, and to the suspension that was obtained were added 550 ml of 10% by vol. of Al$_2$Et$_3$Cl$_3$/heptane solution at room temperature (0.22 mol of Al$_2$Et$_3$Cl$_3$). The suspension was mixed at room temperature for 1/2 hr, and thereafter for 1 hr at +85° C. The product thus obtained was washed five times with 300 ml of heptane at +70° C. adn dried with vacuum. The catalyst had light brown colour.

The analytic results of the catalyst were: Ti 3.2% by wt., Mg 15.0% by wt., Cl 59.9 by wt.

Polymerizing was performed as in Example 1. The activity of the catalyst was 70 kg PP per g Ti. The evaporation residue from the polymerizing fluid was 15.1% of the total polymer quantity obtained. The polypropylene presented isotacticity 95.5% and isotacticity index 81.0%. Specific density was 0.36 g/cm$^3$.

The result of polymerization clearly reveals that the activity of the catalyst and the isotacticity index and specific density of the polypropylene are so poor that the catalyst fails to meet the quality requirements imposed on stereo-specific alpha-olefine polymerizing catalysts. A catalyst of this type is therefore not appropriate for use in polymerizing processes (e.g. polypropylene, polybutylene, poly-4-methyl-1-pentylene, etc.).

We claim:

1. A procedure for manufacturing solid catalyst components for catalysts serving polymerization of alpha-olefines containing more than two carbon atoms, or copolymerization of one or several of these alpha-olefines and ethylene, of the kind which comprises a solid carrier substance containing an organic or inorganic magnesium compound and treated with a titanium halide and with an electron donor compound, wherein
said magnesium compound or a mixture of said magnesium compound and said electron donor compound is sprayed in molten state into a chamber or volume which has been cooled to a temperature at which the catalyst component will solidify from the melt in the form of particles with generally spherical shape, and without an substantial evaporation of solvent,
whereafter said titanium halide treatment is carried out,
wherein said magnesium compound or said mixture is of the form MgCl$_2$(xLOH)ySKY, where x=1 to 6, y=0 to 1.0, and LOH and SKY are each selected from the group consisting essentially of aliphatic or aromatic carboxylic acids, aliphatic or aromatic alkyl esters of carboxylic acids, ethers, aliphatic or aromatic ketones, aliphatic or aromatic aldehydes, aliphatic or aromatic alcohols, aliphatic or aromatic halides, aliphatic or aromatic nitriles, aliphatic or aromatic amines, aliphatic or aromatic phosphines or phosphites, and aliphatic or aromatic silicon ethers.

2. Procedure according to claim 1, wherein SKY has been selected from the group consisting essentially of aromatic mono-, di- or poly-carboxylic acid esters, anhydrides and acid halides.

3. Procedure according to claim 1, wherein the Mg compound is a halogenated organic Mg compound.

4. Procedure according to claim 1, wherein the titanium compound is titanium tetrachloride.

5. Procedure according to claim 1, wherein the chamber is cooled with the aid of a cold, inert gas which is conducted in countercurrent or with the current with reference to the melt that is being sprayed.

6. Procedure according to claim 1, wherein the chamber is cooled with the aid of an inert, cold liquid fluid.

7. Procedure according to claim 1, wherein the cooling is accomplished with the aid of titanium tetrachloride.

8. The procedure of claim 1, wherein LOH is a lower alkyl alcohol containing 1 to 10 carbon atoms.

9. The procedure of claim 5, additionally comprising spraying cold inert hydrocarbon into said chamber to enhance cooling.

10. The procedure of claim 1, additionally comprising spraying cooling gas or fluid into said chamber co-currently to the spraying of the melt.

11. The procedure of claim 1, wherein the particles formed principally have diameters up to about 100 microns.

12. The procedure of claim 1, wherein said magnesium compound/electron donor mixture is $MgCl_2$ (3 EtOH)0.1 diisobutylphthlate.

13. The procedure of claim 1, wherein said magnesium compound/electron donor mixture is $MgCl_2$ (3 EtOH) 0.05 diisobutylphthlate.

14. The procedure of claim 1, wherein said magnesium compound is $MgCl_2$ (3.7 EtOH).

15. The procedure of claim 1, wherein said magnesium compound is $MgCl_2$ (2.9 EtOH).

16. The method of claim 1, wherein $y=0$ and comprising the additional step of
reacting said carrier substance with diisobutylphthlate after said formation of said particles.

17. The method of claim 14, comprising the additional step of
reacting the particles of said Mg compound with 0.2 diisobutylphthlate.

18. The method of claim 15, comprising the additional step of
reacting the particles of said Mg compound with 0.2 diisobutylphthlate.

* * * * *